United States Patent [19]
Togoshi et al.

[11] Patent Number: 5,870,889
[45] Date of Patent: Feb. 16, 1999

[54] LAWN TRACTOR

[75] Inventors: Yoshikazu Togoshi; Osami Fujiwara; Hideya Umemoto; Hironori Tsuchihashi; Yoshiyuki Esaki; Akio Matsui, all of Osaka, Japan

[73] Assignee: Kubota Corporation, Osaka, Japan

[21] Appl. No.: 821,554

[22] Filed: Mar. 21, 1997

[30]     Foreign Application Priority Data

Mar. 22, 1996 [JP] Japan ................................. 8-065674

[51] Int. Cl.$^6$ .......................... A01D 87/10; A01D 67/00; A01D 34/00
[52] U.S. Cl. .......................... 56/320.2; 56/13.3; 56/320.1; 56/203
[58] Field of Search ..................... 56/13.3, 13.4, 56/320.1, 320.2, 202, 203, DIG. 8

[56]     References Cited

U.S. PATENT DOCUMENTS

| | | |
|---|---|---|
| 3,065,588 | 11/1962 | Shaw . |
| 3,969,876 | 7/1976 | Turos . |
| 4,523,788 | 6/1985 | Prasad . |
| 4,579,363 | 4/1986 | Allen et al. . |
| 4,711,073 | 12/1987 | Freier, Jr. et al. . |
| 4,945,716 | 8/1990 | Murakawa et al. . |
| 4,996,829 | 3/1991 | Saitoh et al. . |
| 5,018,344 | 5/1991 | Samejima et al. ........................ 56/202 |
| 5,064,315 | 11/1991 | Samejima et al. . |
| 5,070,683 | 12/1991 | Eggenmueller . |
| 5,107,661 | 4/1992 | Shimamura . |
| 5,224,327 | 7/1993 | Minoura et al. . |
| 5,542,243 | 8/1996 | Yuki et al. . |
| 5,560,188 | 10/1996 | Murakawa et al. . |

FOREIGN PATENT DOCUMENTS

| | | | |
|---|---|---|---|
| 2624983 | 12/1976 | Germany | ................................. 56/13.4 |
| 3-123411 | 5/1991 | Japan . | |

Primary Examiner—Thomas B. Will
Assistant Examiner—Arpad Fabian Kovacs
Attorney, Agent, or Firm—Edwin E. Greigg; Ronald E. Greigg

[57]     ABSTRACT

A mower unit includes a blade housing, and a guide plate for dividing a grass clipping flow space formed in the blade housing, along a flowing direction into a first flow space and a second flow space communicating with each other in a downstream position with respect to the flowing direction. The blade housing has a discharge section for discharging grass clippings cut by cutting blades, in a predetermined direction along with air flows. The discharge section has an intake opening for drawing ambient air into the second flow space. The guide plate may be displaceable relative to the blade housing to vary a sectional passage area of the first flow space.

16 Claims, 12 Drawing Sheets

FIG.16

LAWN TRACTOR

BACKGROUND OF THE INVENTION

1. Field of the Invention

This invention relates to a lawn tractor, and more particularly to a mower unit for use with a lawn tractor for discharging grass clippings cut by cutting blades in a predetermined direction as entrained by air flows.

2. Description of the Related Art

Generally, a lawn tractor discharges grass clippings cut by cutting blades through a discharge opening formed at a lateral end of a blade housing, or transmits the grass clippings through a transport duct to a grass catcher mounted rearwardly of a tractor body. The lawn tractor disclosed in Japanese Patent Laying-Open Publication H3-123411 or U.S. Pat. No. 5,560,188, for example, has a blade housing and a grass catcher connected through a duct, with a blower mounted in an intermediate position of the duct for causing grass clippings to flow smoothly to the grass catcher. The duct feeds the grass clippings discharged through a lateral end of the blade housing into the grass catcher mounted rearwardly of a tractor body. A region of transition from the blade housing to the duct includes a grass flow passage bent nearly 90 degrees, to limit an extent to which the duct protrudes laterally of the tractor body. In the region of transition, therefore, the flow of grass clippings is disturbed, i.e. a smooth flow thereof cannot be expected.

SUMMARY OF THE INVENTION

The object of this invention is to provide a mower unit for enabling a smooth flow of grass clippings through a region of transition from a blade housing to a duct, and a lawn tractor capable of transmitting grass clippings from such a mower unit to a grass catcher by means of a blower.

The above object is fulfilled, according to this invention, by a mower unit including a blade housing, and a guide device for dividing a grass clipping flow space formed in the blade housing, along a flowing direction, into a first flow space and a second flow space communicating with each other in a downstream position with respect to the flowing direction. The blade housing has a discharge section for discharging grass clippings cut by cutting blades, in a predetermined direction along with air flows. The discharge section has an intake opening for drawing ambient air into the second flow space. With this construction, entangled grass clippings flowing along the guide device into the first flow space are loosened up by mixing with ambient air flowing in through the intake opening, along the guide device and into the second flow space. Consequently, the grass clippings flow smoothly adjacent to the discharge section of the blade housing. Further, since the guide device divides the flow space into the first flow space and second flow space, foreign matters such as pebbles flying from the cutting blades would not move from the first flow space to the second flow space and scatter out through the intake opening.

Particularly where the guide device is in the form of a guide plate extending in the flowing direction, one surface of the guide plate guides grass clippings flowing through the first flow space, and the other surface thereof guides replenish air flowing through the second flow space. Such a guide plate may have a very simple structure, and yet contribute to smoothing the flow grass clippings. Where the guide device defines a guide surface for colliding with air flows entering through the intake opening, the guide surface will restrain foreign matters from entering the first flow space along with the air flows. The guide device may be arranged displaceable relative to the blade housing to vary a sectional passage area of the first flow space, which provides an advantage of forming a flow passage according to the quantity of grass clippings. It is particularly preferable that the guide device is biased in a direction to diminish the sectional passage area of the first flow space. With this construction, the guide device is displaced against the biasing force by the kinetic energy of grass clippings when a large quantity of grass is cut, thereby enlarging the sectional passage area of the first flow space. Conversely, when grass is cut in a small quantity, the sectional passage area of the first flow space is diminished.

Where the blade housing includes an observation window opposed to the guide device, the driver may readily confirm conditions of grass clippings and the guide device. This enables the driver to preclude troubles in transporting grass clippings such as stagnation of the grass clippings.

Other features and advantages of this invention will be apparent from the following description of the embodiments to be taken with reference to the drawings.

DESCRIPTION OF THE PREFERRED EMBODIMENTS

An embodiment of this invention will be described hereinafter with reference to the drawing.

Figure 1:
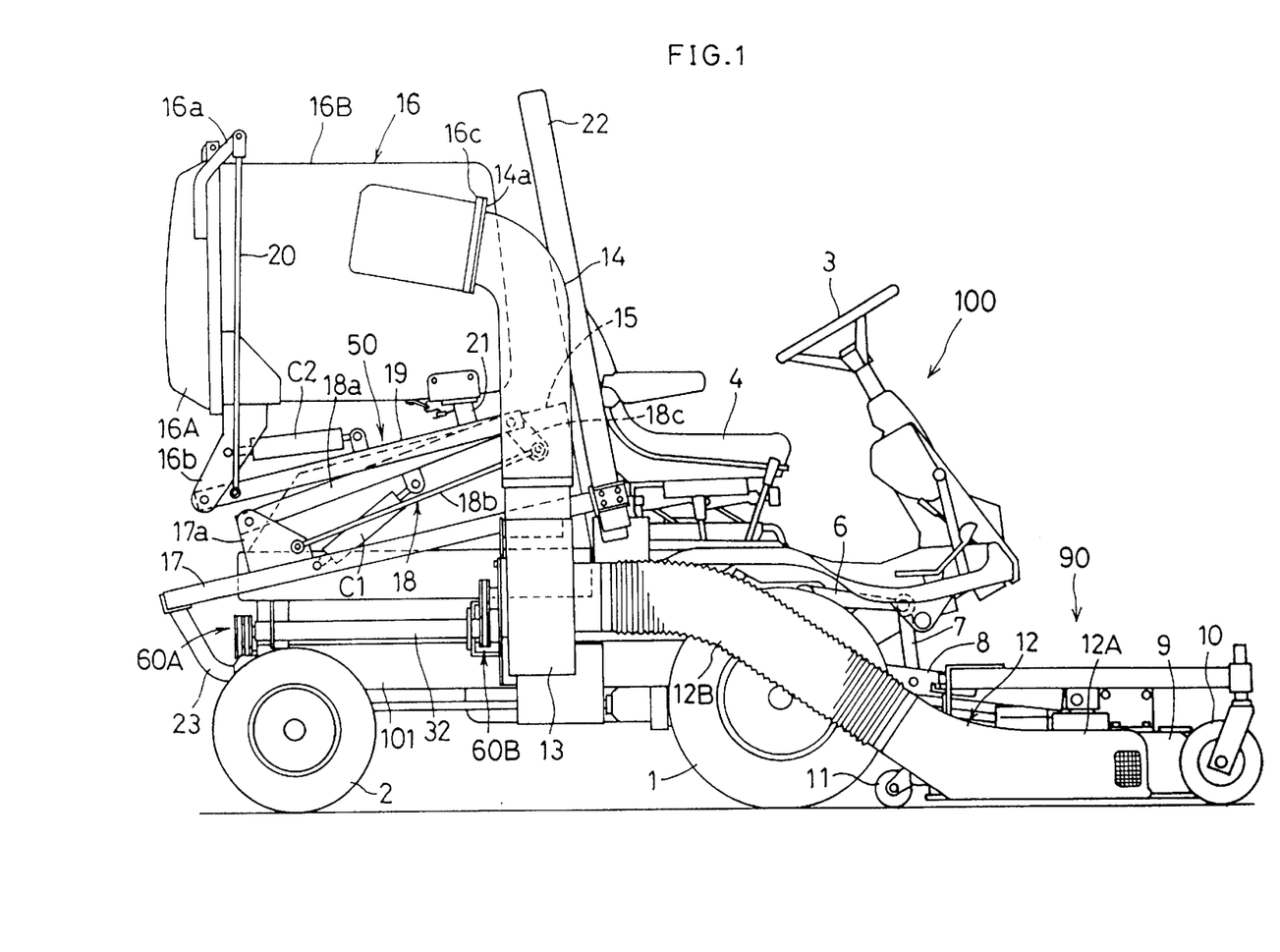
FIG. 1 is a side elevation of a lawn tractor according to this invention.
Figure 2:
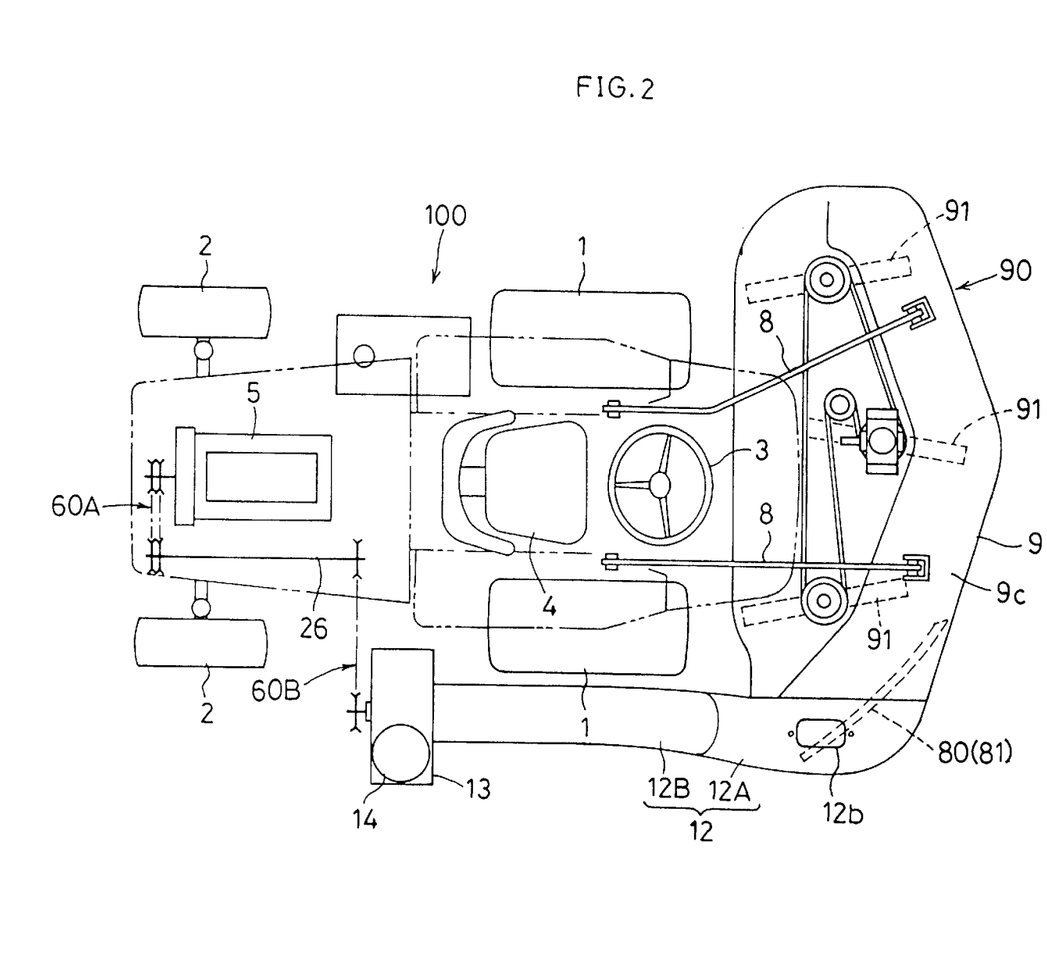
FIG. 2 is a schematic plan view of the lawn tractor.

FIGS. 1 and 2 show a front-mount type riding lawn tractor having a mower unit 90 disposed in front of a tractor body 100. This lawn tractor is a four wheel drive, rear wheel steering type vehicle. The tractor body 100 having a steering handle 3, a driver's seat 4 and an engine 5 is supported on front wheels 1 and rear wheels 2. The mower unit 90 is vertically movably suspended through lift arms 6 driven by a hydraulic cylinder (not shown), connecting links 7, and lift links 8 supported by the tractor body to be pivotable about a transverse axis.

The mower unit 90 includes three blades 91 mounted in a blade housing 9 to be rotatable about vertical axes. The blade housing 9 has a pair of right and left gauge wheels 10 arranged in front positions thereof for adjusting cutting height, and an anti-scalp roller 11 in a center rear position for riding on obstacles. Grass clippings cut by the blades 91 are transmitted, along with air flows produced by the blades 91, from a lateral end of the blade housing 9 through a grass transport passage to a grass catcher 16 disposed above an engine hood 15 in a rear position of the tractor body. The grass transport passage includes a front duct 12 connected to the lateral end of the blade housing 9, a suction blower 13 mounted in a lateral position of the tractor body between the front wheels 1 and rear wheels 2, and a rear duct 14 connected to the grass catcher 16.

Figure 3:
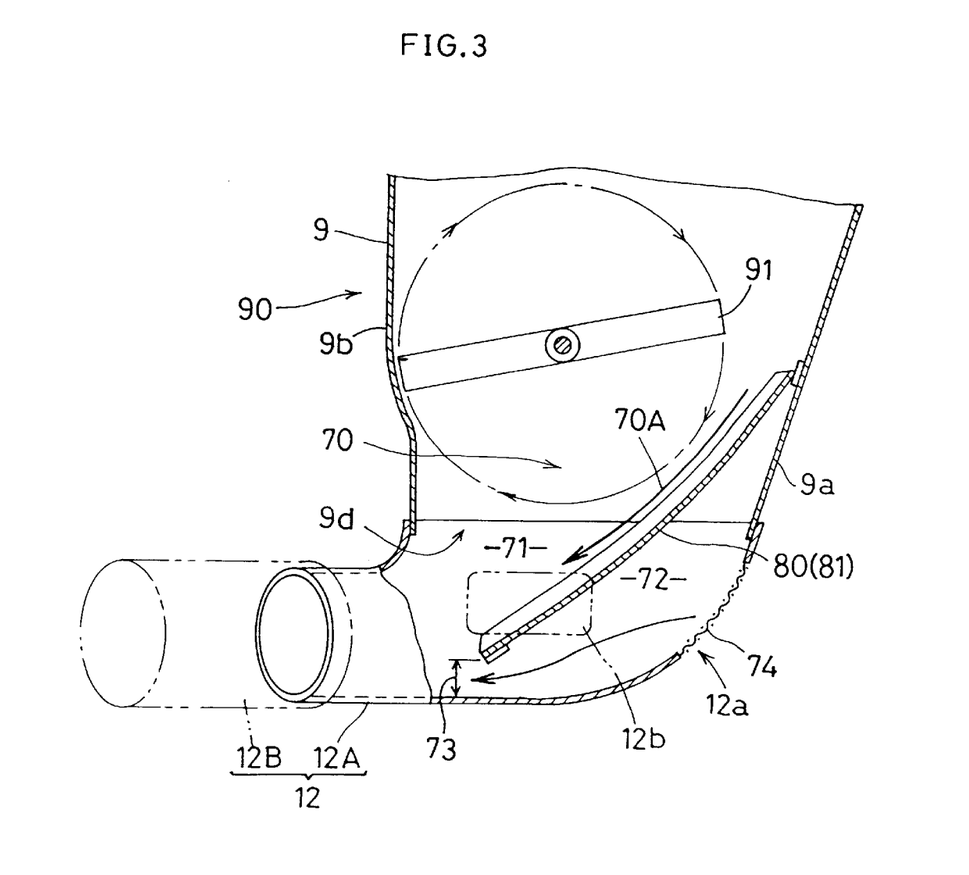
FIG. 3 is a plan view, partly in section, of a mower unit showing a layout of a guide plate in a region of transition from a blade housing to a duct.

As shown in FIG. 3, the blade housing 9 includes a ceiling wall 9c for rotatably supporting the blades 91, a front wall 9a depending from the ceiling wall 9c to cover an area forwardly (with respect to the running direction of the tractor) of the blades 91, and a rear wall 9b depending from the ceiling wall 9c to cover an area rearwardly of the blades 91. The blade housing 9 has an opening 9d at the righthand end thereof. The front duct 12 includes a coupling portion 12A communicating with the opening 9d of the blade housing 9, and a tube 12B. The coupling portion 12A has a small width so that the coupling portion 12A protrudes only to a limited extent laterally of the tractor body. Consequently, a region of transition from the blade housing 9 to the front duct 12 defines a sharply curved grass flow space 70. The grass clippings transported along the front wall of the blade housing 9 must be deflected rearward in the flow space 70. To smooth grass clipping flows through the grass flow space 70, a guide device 80 is provided which divides the grass flow space 70 along a flowing direction 70A into a first flow space 71 and a second flow space 72. In this embodiment, the guide device 80 is in the form of a guide plate 81. The guide plate 81 is fixed at one end thereof to the front wall 9a. A gap 73 is formed between the other end of the guide plate 81 and a wall of the coupling portion 12A of the front duct 12. An air intake opening 12a for drawing in ambient air is formed in a front wall of the coupling portion 12A defining the second flow space 72. A net 74 is attached to extend over the opening 12a.

The guide plate 81 is disposed at an angle to smooth an outline of grass clipping flows through the first flow space 71, which provides an effect of preventing stagnation and stoppage of grass clippings in the first flow space 71. Moreover, ambient air drawn in through the intake opening 12a by action of the suction blower 13 passes through the second flow space 72 and gap 73 to join the grass clipping flows emerging from the first flow space 71. The grass clippings disentangled by the increased air flows are transmitted to the grass catcher 16 through the tube 12B, suction blower 13 and rear duct 14. The layout of this guide plate 81 in the grass flow space 70 restrains foreign matters such as pebbles and sand picked up by the blades 91 and flowing through the grass flow space 70, from scattering out through the intake opening 12a. The guide plate 81 also knocks down foreign matters such as pebbles and sand drawn in through the intake opening 12a to reduce their kinetic energy, which would otherwise act adversely on the suction blower 13 and the like.

An observation window 12b is formed in an upper wall of the coupling portion 12A for allowing a visual confirmation of conditions around the guide plate 81. This observation window 12b is formed of a transparent plastic plate.

Figure 4:
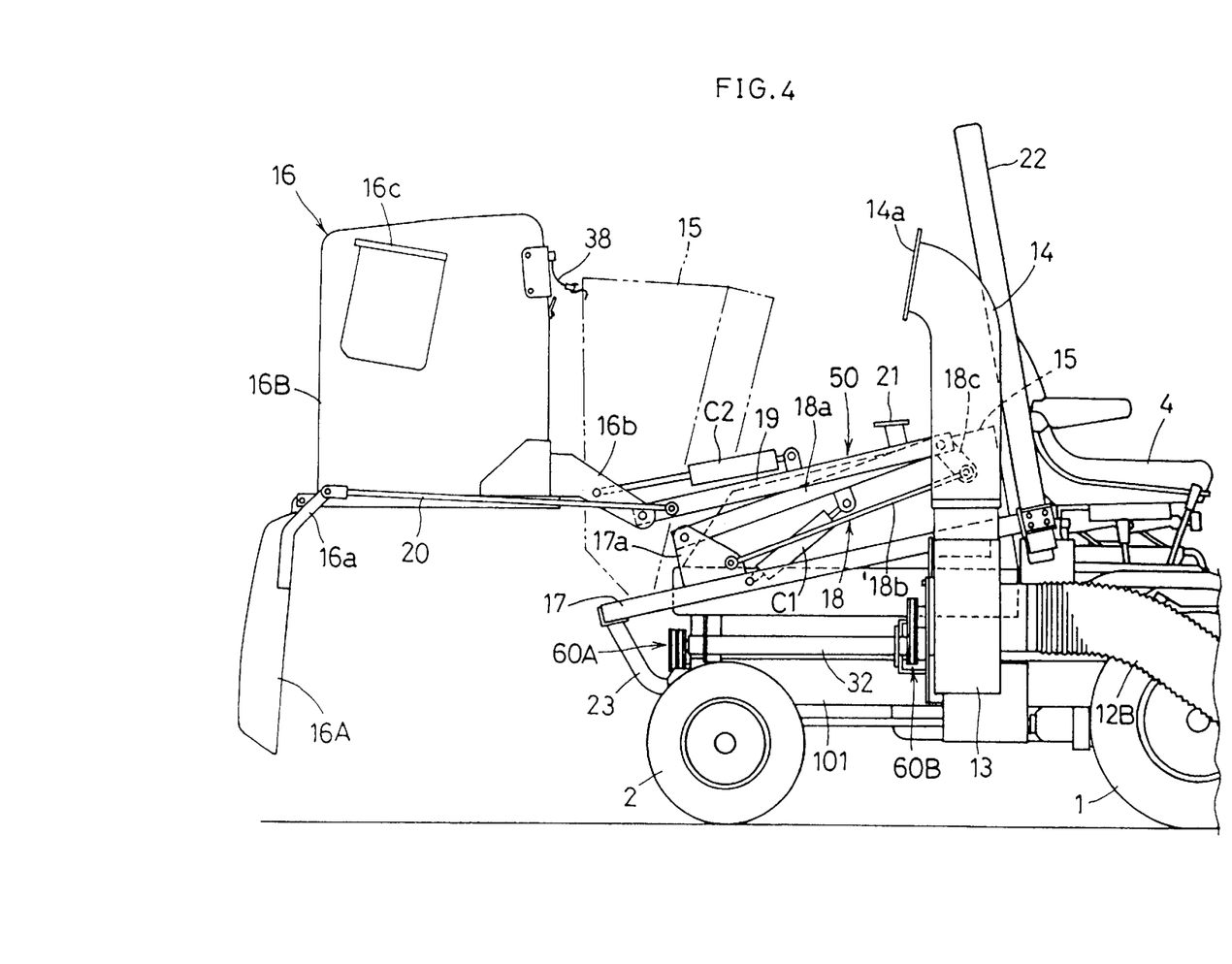
FIG. 4 is a side view showing a low dump position of a grass catcher.
Figure 5:
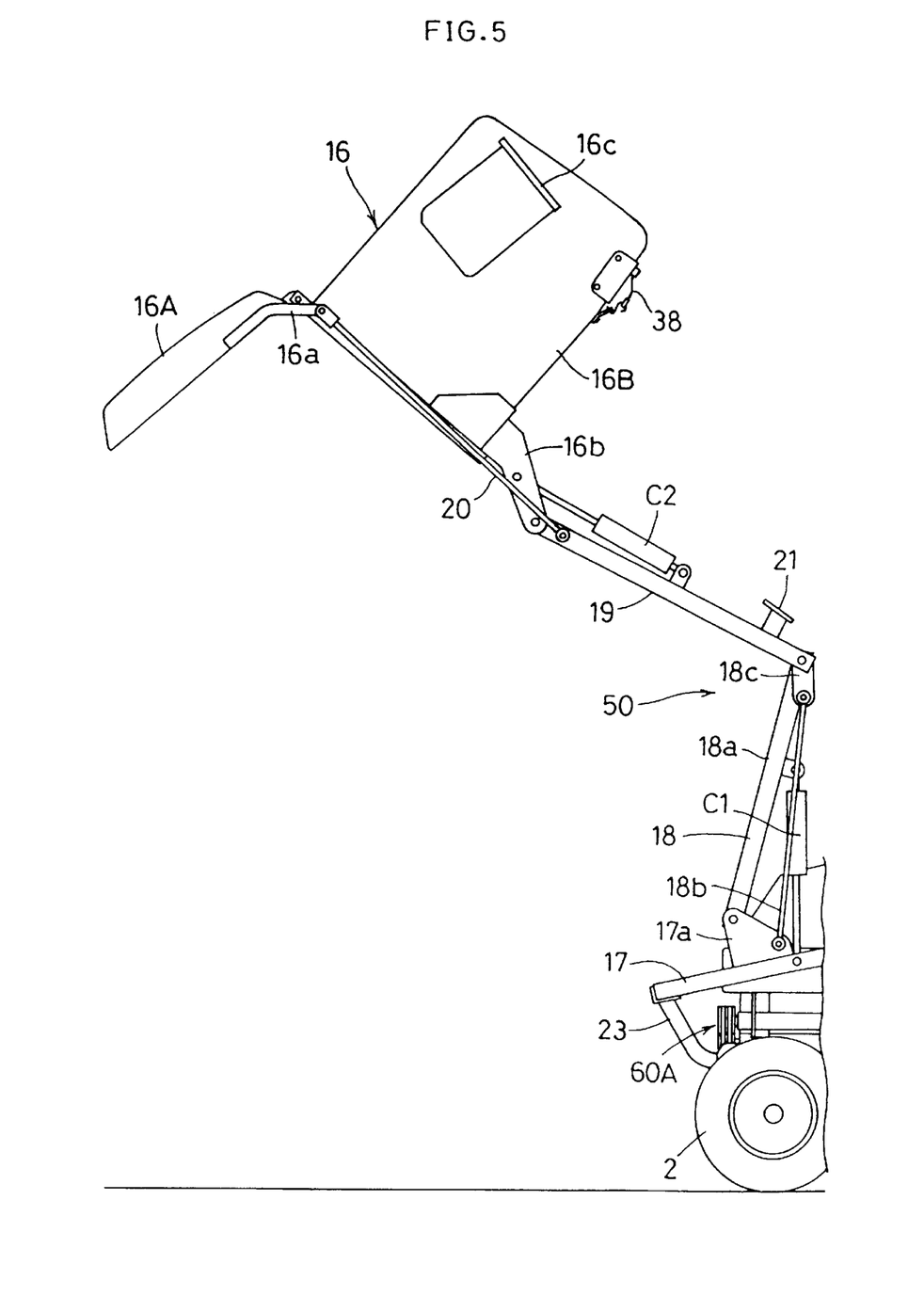
FIG. 5 is a side view showing a high dump position of the grass catcher.

As shown in FIGS. 4 and 5, the grass catcher 16 is movable between a low dump position and a high dump position through a collapsible link mechanism 50 vertically flexible by extension and contraction of a lift cylinder C1. The collapsible link mechanism 50 includes a trapezoidal parallelogram link mechanism 18 vertically movable by the extension and contraction of the lift cylinder C1, and flexion links 19 pivotably supported at distal ends of the trapezoidal parallelogram link mechanism 18.

The collapsible link mechanism 50 will be described in greater detail hereunder. A sub-frame 17 extends around the engine hood 15 for supporting the grass catcher 16. The sub-frame 17 has brackets 17a each pivotally supporting proximal ends of a top link 18a and a lower link 18b constituting the trapezoidal parallelogram link mechanism 18. Each flexion link 19 is secured to a connecting link 18c extending between distal ends of the top link 18a and lower link 18b. The lift cylinder C1 extends between the grass catcher supporting sub-frame 17 and one of the top links 18a of the trapezoidal parallelogram link mechanism 18. The grass catcher 16 has swing arms 16b pivotally connected to distal ends of the flexion links 19, respectively. A dump cylinder C2 extends between one of the flexion links 19 and one of the swing arms 16b for turning the grass catcher 16. The grass catcher 16 includes a lid 16A pivotally connected to an upper position of a container 16B to be switchable between open state and closed state. A lid opening and closing rod 20 extends between each flexion link 19 and each lid swing arm 16a extending from the lid 16A. The trapezoidal parallelogram link mechanism 18 has respective connection points set so that the flexion links 19 extend with extension of the lift cylinder C1. The lid opening and closing rods 20 have such a length and connection to the swing arms 16b that the lid 16A is opened with extension of the dump cylinder C2.

Thus, as shown in FIG. 5, when the lift cylinder C1 is extended, the trapezoidal parallelogram link mechanism 18 is raised to extend the flexion links 19. When the dump cylinder C2 is extended, the swing arms 16b swing backward to turn over the container 16B, and the lid opening and closing rods 20 pivot backward to open the lid 16A automatically.

For dumping in the lower position, as shown in FIG. 4, the dump cylinder C2 is extended with the trapezoidal parallelogram link mechanism 18 and flexion links 19 folded or contracted. The grass catcher 16 capable of the dumping action has the container 16B movable to rest on container seats 21 mounted on the flexion links 19.

Figure 6:
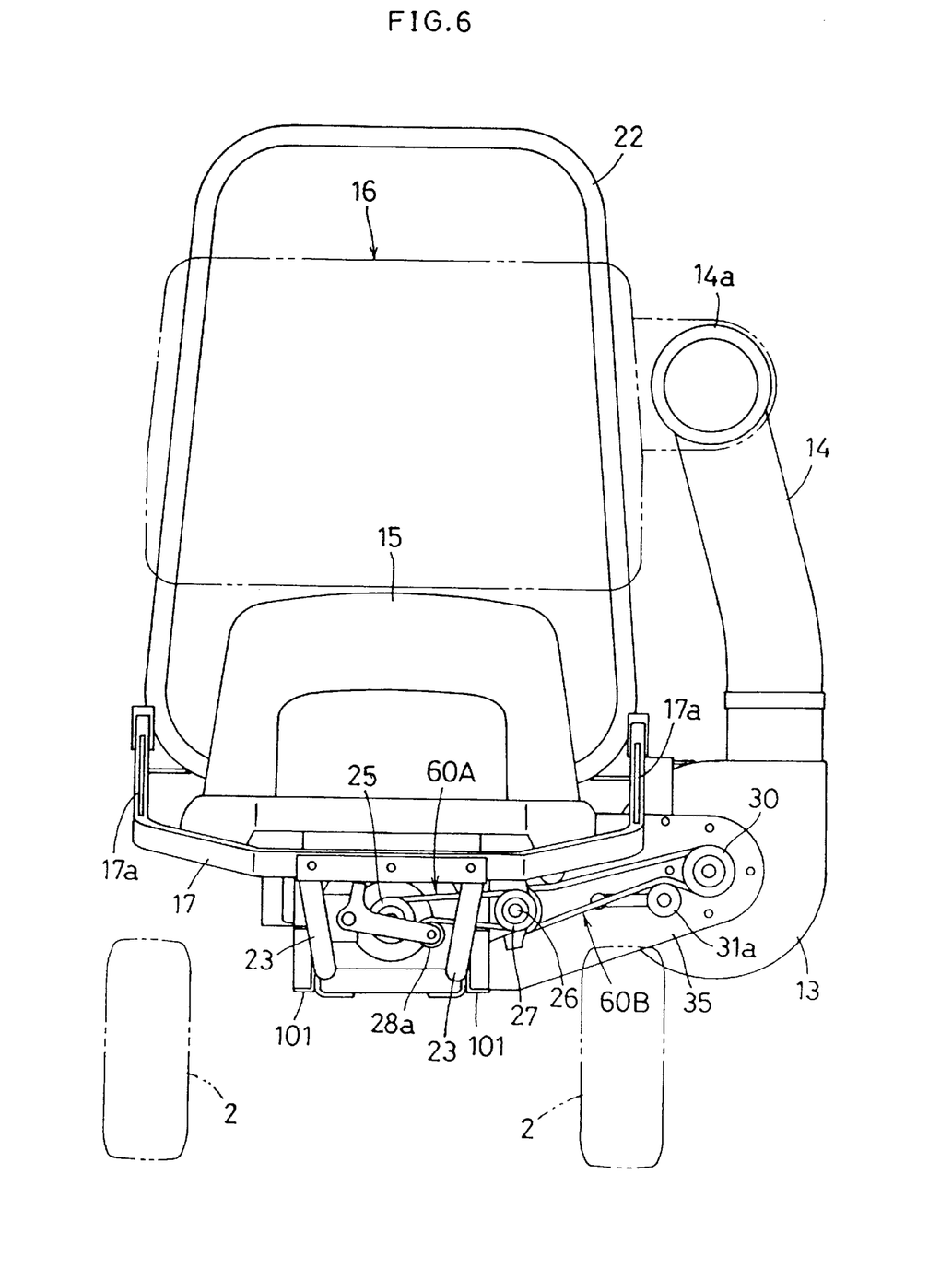
FIG. 6 is a rear view of a tractor body.

As seen from FIGS. 1 and 6, the grass catcher supporting sub-frame 17 is U-shaped in plan view, with right and left forward ends thereof bolted to a safety frame 22 disposed behind the driver's seat 4, and with rear, middle positions thereof bolted to support frames 23 extending from a body frame 101. Thus, the entire structure including the collapsible link mechanism 50 and grass catcher 16 may be detached by disconnecting the grass catcher supporting sub-frame 17 from the safety frame 22 and support frames 23.

Next, a drive transmission structure for the blower 13 will be described.

Figure 7:
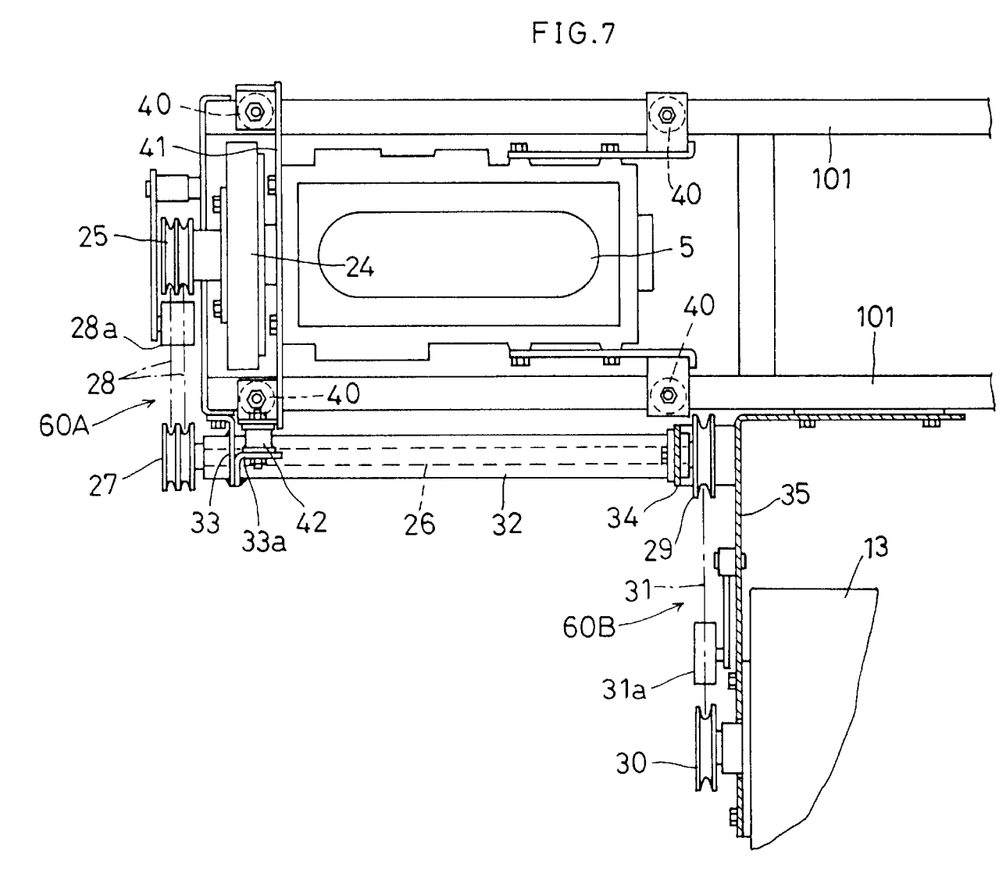
FIG. 7 is a plan view showing a transmission structure for driving a blower.

As shown in FIG. 7, a transmission belt 28 is wound around an output pulley 25 fixed to a flywheel 24 mounted at a rear end of engine 5 and an input pulley 27 at a rear end of a fore and aft shaft 26 disposed outwardly of the right side of the body frame 101. A transmission belt 31 is wound around an output pulley 29 at a forward end of the fore and aft shaft 26 and an input pulley 30 of the blower 13. Thus, output of the engine 5 is transmitted to the blower 13 through a first belt transmission 60A, fore and aft shaft 26 and a second belt transmission 60B. The first belt transmission 60A is a tension clutch type transmission including a tension pulley 28a movable between a position in pressure contact with the transmission belt 28 to transmit drive to the blower 13 and a position retracted therefrom to break the drive transmission. The second belt transmission 60B includes a fixed tension pulley 31a.

Figure 8:
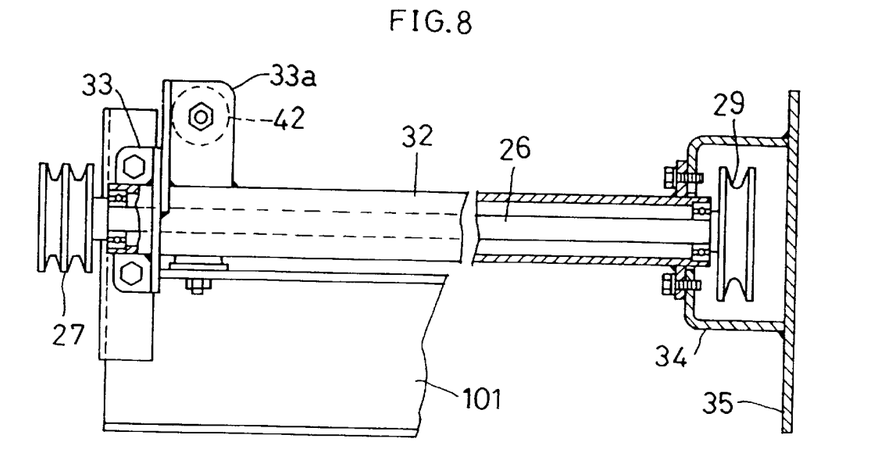
FIG. 8 is a side view of the transmission structure for driving the blower.

As seen from FIG. 6, the fore and aft shaft 26 is disposed more inwardly of the tractor body than the engine hood 15 and above the rear wheels 2, not to interfere with the dirigible rear wheels 2. As shown in FIG. 8, the fore and aft shaft 26 is rotatably supported in a round pipe 32 through bearings. The round pipe 32 is supported at a rear end thereof by the body frame 101 through a support stay 33, and at a forward end through a support stay 34 by a rear surface of a blower support plate 35, L-shaped in plan view, fixed to the body frame 101.

Figure 9:
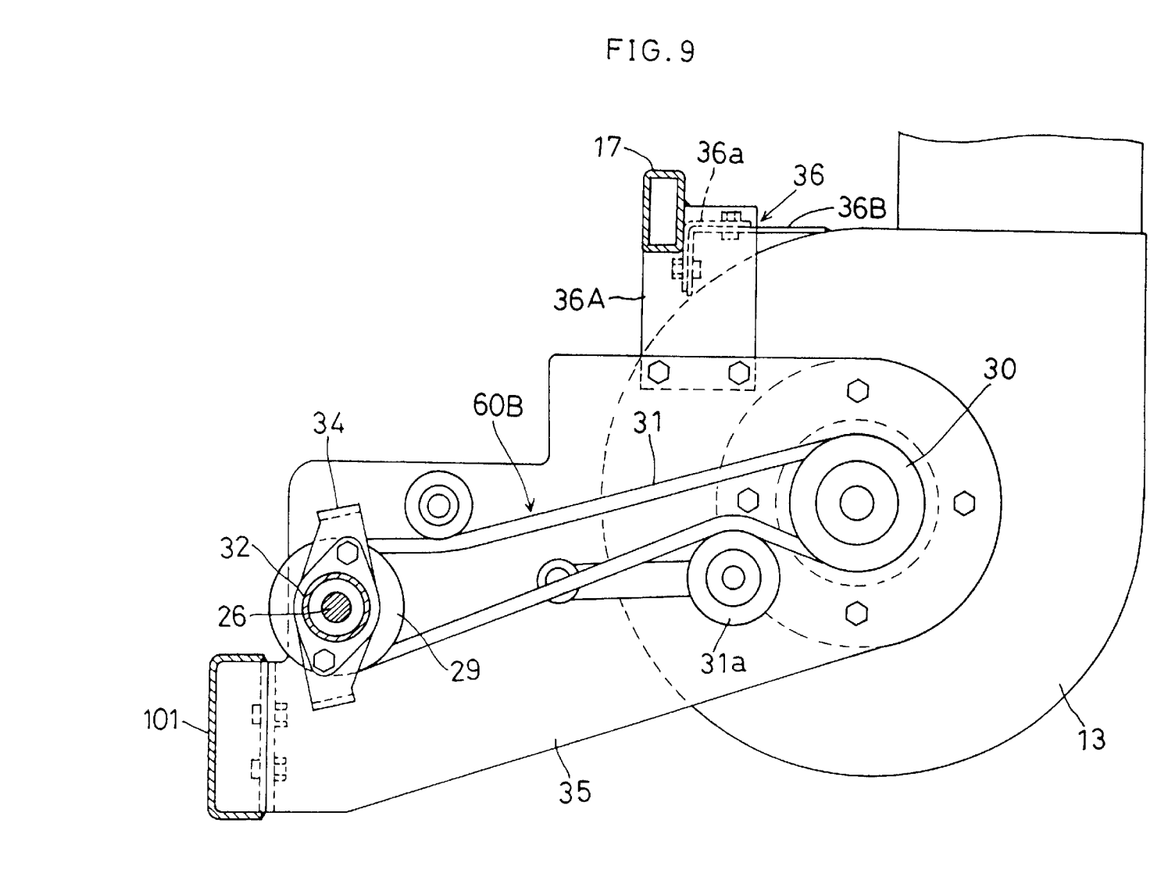
FIG. 9 is a rear view showing a blower support structure.

As shown in FIG. 9, the blower 13 is bolted to a front surface of the blower support plate 35. A blower case is connected in an upper position thereof through a connector 36 to the grass catcher supporting sub-frame 17. The connector 36 includes a plate 36A secured to the sub-frame 17 and having an angle element 36a secured to a front position thereof, and an angle plate 36B secured to the blower case. The angle element 36a and angle plate 36B are bolted to each other. The plate 36A secured to the sub-frame 17 is bolted at a lower end thereof to the blower support plate 35. These components increase supporting strength of the blower support plate 35 and the blower case.

Figure 10:
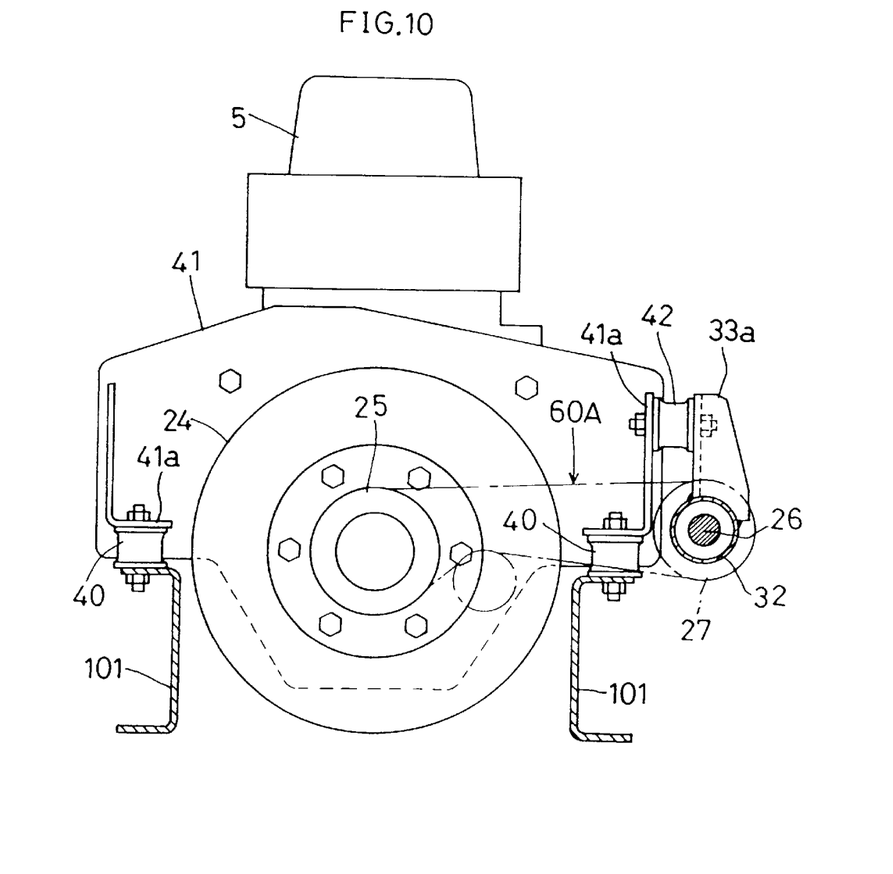
FIG. 10 is a rear view of the transmission structure for driving the blower.

As shown in FIG. 10, the engine 5 is supported by the body frame 101 through four vibration-isolating rubber elements 40. The rubber elements 40 contacting rear positions of the engine 5 are arranged between lower surfaces of a pair of right and left angle plates 41a secured to a rear surface of a rear end plate 41 fixed to a rear surface of the engine 5, and upper surfaces of the body frame 101. A bracket 33a, L-shaped in plan view, is secured to a front surface of the support stay 33 of the round pipe 32 and a surface of the round pipe 32 to act as a fixing element. A vibration-isolating rubber element 42 is disposed between the bracket 33a and the right angle plate 41a. This construction suppresses sideways wobbles of the engine 5 when the transmission 60A transmits drive.

Figure 11:
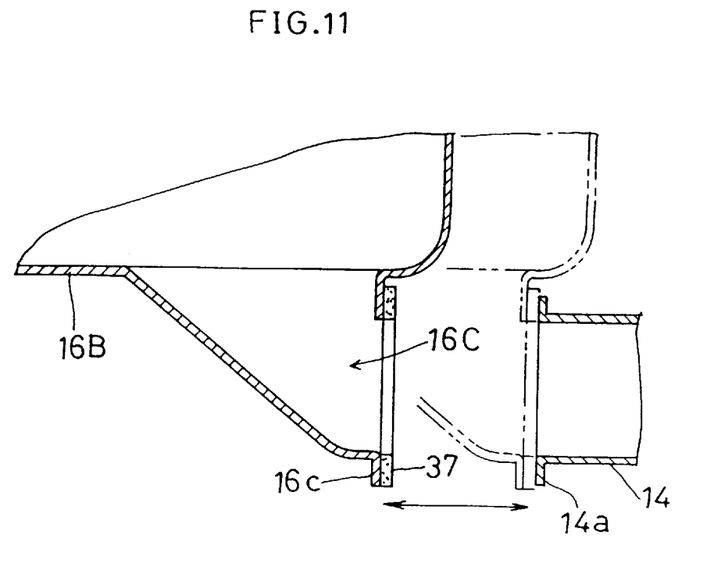
FIG. 11 is a plan view, in cross section, showing a connection between the grass catcher and rear duct.

The front duct 12 connected to an intake of the blower 13 is a flexible duct for permitting vertical movement of the mower unit 90. The rear duct 14 connected to an outlet of the blower 13 is a rigid duct separably connected through flanges to the grass catcher 16 capable of dumping action. As shown in FIG. 11, a flange 14a formed at a rear end of the rear duct 14 and a flange 16c formed at an end of an inlet to the container 16B have mating surfaces fitting each other when the grass catcher 16 is in a horizontal, loaded state. To secure a tight joint, a seal 37 formed of sponge is fixed to the flange 16c at the inlet end of the container 16B.

Figure 12:
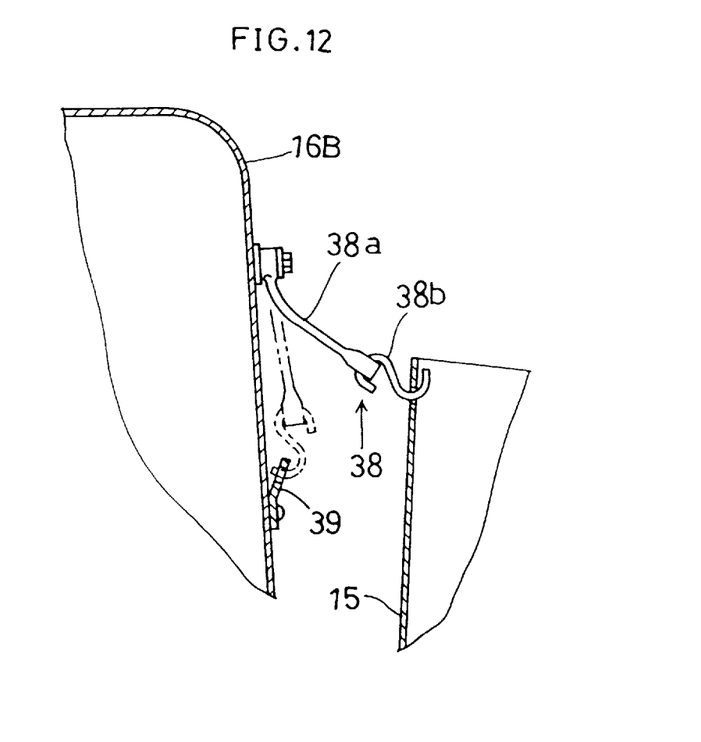
FIG. 12 is a side view, in vertical section, showing a support structure for an engine hood in an open position.

As shown in two-dot-and-dash lines in FIG. 4, the engine hood 15 is openable by pivoting about a rear position of the vehicle body. A hood retainer 38 is attached to a bottom surface of the container 16B for maintaining the hood 15 in an open position. As shown in FIG. 12, the hood retainer 38 includes a rubber element 38a, and a hook 38b attached to the rubber element 38a. The hood retainer 38 is attached to the bottom surface of the container 16B to be movable about a vertical axis. When out of use, the hood retainer 38 is fixedly engaged in a bore of an engaging element 39 attached to the container 16B. In use, the hood retainer 38 engages an engaging bore formed in the hood 15 to maintain the latter in the open position.

Figure 13:
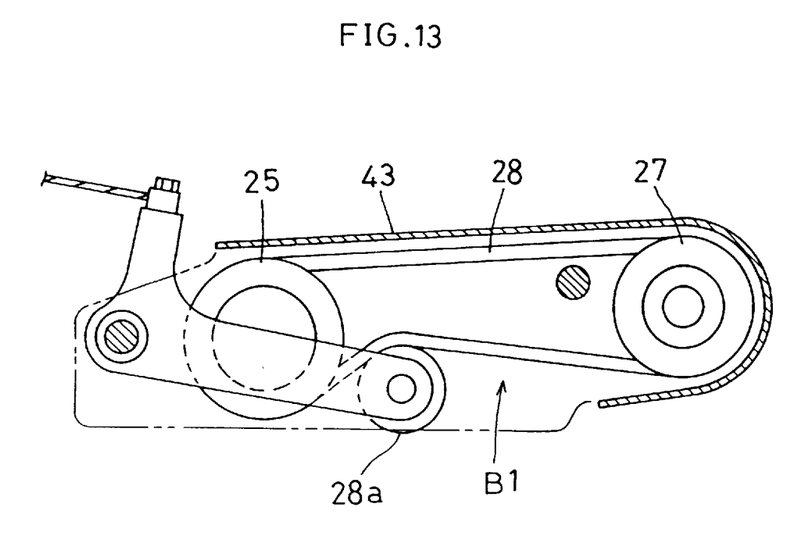
FIG. 13 is a rear view, in vertical section, of a first belt transmission.
Figure 14:
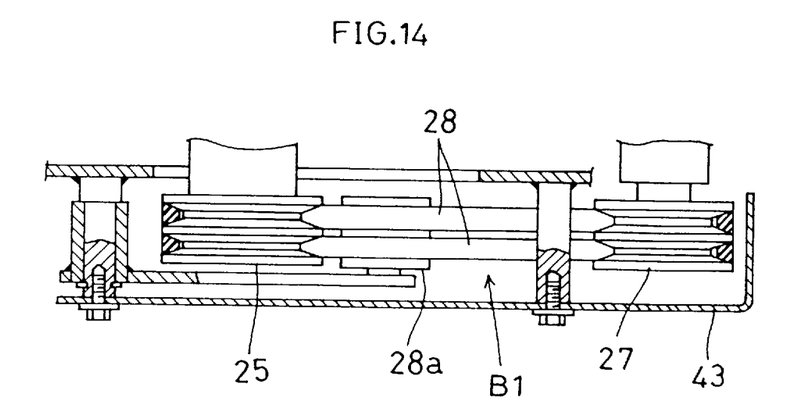
FIG. 14 is a plan view, in cross section, of the first belt transmission.

As shown in FIGS. 13 and 14, a belt cover 43 is disposed outside the first belt transmission 60A. The belt cover 43 has an upper portion thereof disposed close to the transmission belt 28 to prevent the belt 28 from falling off the pulleys when the tension clutch is disengaged.

[Other Embodiments]

Figure 15:
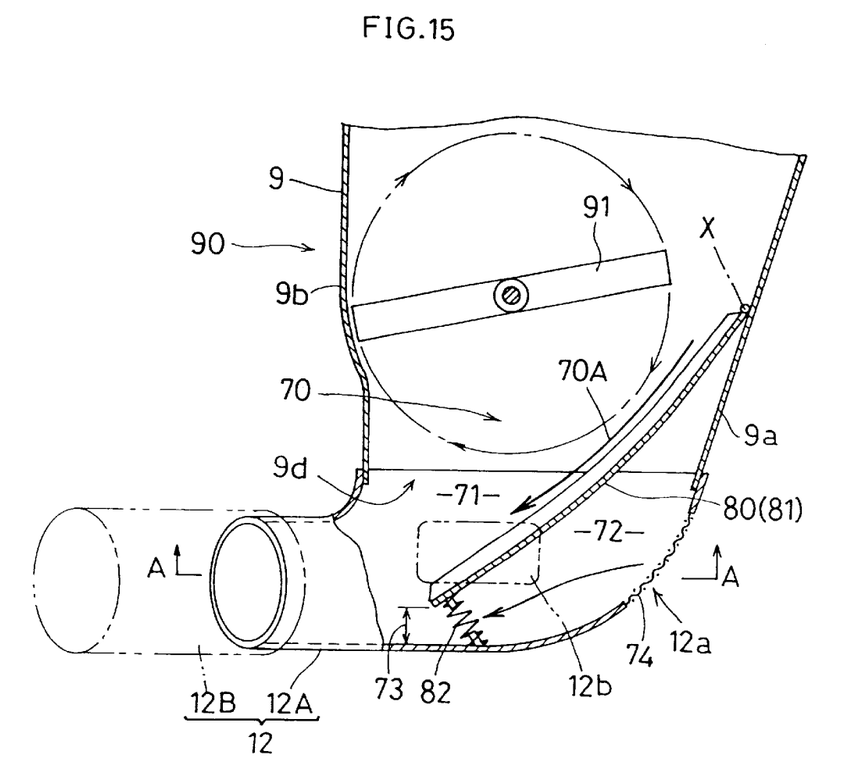
FIG. 15 is a plan view, partly in section, of the mower unit showing a modified guide plate.

FIG. 15 shows a variable guide plate 81 acting as the guide device 80. This guide plate 81 is pivotally connected at one end thereof, upstream with respect to grass clipping flows, to the front wall 9a through a vertical axis X. The downstream end of the guide plate 81 is biased by a spring 82 in a direction to diminish a sectional passage area of the first flow space 71, i.e. in a direction to enlarge the gap 73. Thus, with an increase in the quantity of grass clippings, the guide plate 81 swings counterclockwise against the biasing force of spring 82 to enlarge the passage width of the first flow space 71, thereby to check stagnation of grass clippings.

Figure 16:
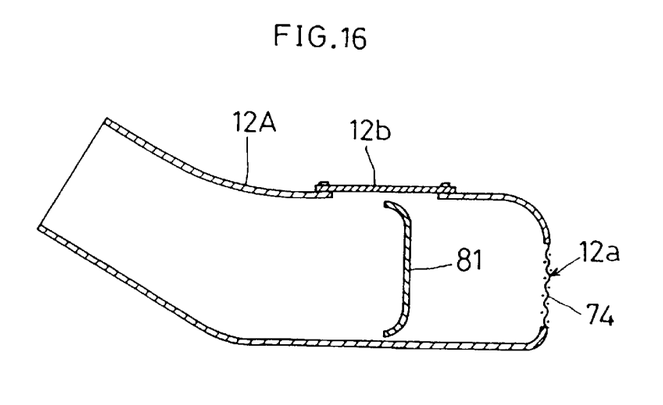
FIG. 16 is a section taken on line A—A of FIG. 15.

FIG. 16 shows an observation window 12b removably attached to the coupling portion 12A by bolts. By removing the observation window 12b, the guide plate 81 becomes accessible for maintenance and inspection.

Instead of being variable as noted above, the guide plate 81 may advantageously be moved to a selected optimum position. This construction may be achieved by forming a slot or a plurality of bores in the blade housing 9 or front duct 12 for attaching the guide plate 81, or by adopting a method of fixing the guide plate 81 in a selected position about the vertical axis X.

The foregoing embodiments have been described as including the suction blower 13. However, the suction blower 13 may be omitted where the blades alone can generate air flows adequate to deliver grass clippings to the grass catcher 16.

Apart from collecting grass clippings in the grass catcher 16, this invention includes, within its scope, a structure for discharging grass clippings directly rearward from the coupling portion 12A of the discharge duct 12.

What is claimed is:

1. A mower unit for use with a lawn tractor comprising:
a blade housing,
said blade housing including:
a ceiling wall for rotatably supporting cutting blades;
a front wall depending from said ceiling wall for covering an area forwardly of said cutting blades;
a rear wall depending from said ceiling wall for covering an area rearwardly of said cutting blades; and
a discharge section for discharging grass clippings cut by said cutting blades, in a predetermined direction along with air flows;
guide means for dividing a grass clipping flow space formed in said blade housing, along a flowing direction into a first flow space and a second flow space, said first flow space and said second flow space communicating with each other near said discharge section in a downstream position with respect to said flowing direction; and an air intake opening formed in a wall of said blade housing in said discharge section for drawing ambient air into said second flow space.

2. A mower unit as defined in claim 1, wherein said guide means is in a form of a guide plate extending in said flowing direction, said guide plate having one surface for guiding grass clippings flowing through said first flow space, and another surface for guiding replenished air flowing in through said intake opening and through said second flow space.

3. A mower unit as defined in claim 1, wherein said guide means defines a guide surface for colliding with air flows entering through said intake opening, to restrain foreign matters from entering said first flow space along with the air flows.

4. A mower unit as defined in claim 1, wherein said guide means is displaceable relative to said blade housing to vary a sectional passage area of said first flow space.

5. A mower unit as defined in claim 4, wherein said guide means is biased in a direction to diminish said sectional passage area of said first flow space.

6. A mower unit as defined in claim 4, wherein said blade housing further includes an observation window opposed to said guide means.

7. A mower unit for use with a lawn tractor comprising:
a blade housing,
said blade housing including:
   a ceiling wall for rotatably supporting cutting blades;
   a front wall depending from said ceiling wall for covering an area forwardly of said cutting blades;
   a rear wall depending from said ceiling wall for covering an area rearwardly of said cutting blades; and
   a discharge section for discharging grass clippings cut by said cutting blades, in a predetermined direction along with air flows; and
   guide means for dividing a grass clipping flow space formed in said blade housing, along a flowing direction into a first flow space and a second flow space, said guide means being displaceable relative to said blade housing to vary a sectional passage area of said first flow space.

8. A mower unit as defined in claim 7, wherein said guide means is biased in a direction to diminish said sectional passage area of said first flow space.

9. A lawn tractor comprising:
a mower unit
said mower unit including:
   a blade housing having a ceiling wall, a front wall and a rear wall:
   cutting blades rotatably supported by said ceiling wall; and
   a discharge opening formed in a lateral end region of said blade housing for discharging grass clippings cut by said cutting blades, along with air flows;
   a grass catcher disposed rearwardly of a tractor body;
   a transport duct for connecting said discharge opening to said grass catcher;
   a suction blower mounted in said transport duct;
   guide means for dividing a grass clipping flow space formed in a region of transition from said blade housing to said transport duct, along a flowing direction into a first flow space and a second flow space, said first flow space and said second flow space communicating with each other near said discharge section in a downstream position with respect to said flowing direction; and
   an air intake opening formed in a wall of said blade housing in said region of transition for drawing ambient air into said second flow space.

10. A lawn tractor as defined in claim 9, wherein said guide means is in a form of a guide plate extending in said flowing direction, said guide plate having one surface for guiding grass clippings flowing through said first flow space, and another surface for guiding replenished air flowing in through said intake opening and through said second flow space.

11. A lawn tractor as defined in claim 9, wherein said guide means defines a guide surface for colliding with air flows entering through said intake opening, to restrain foreign matters from entering said first flow space along with the air flows.

12. A lawn tractor as defined in claim 9, wherein said guide means is displaceable relative to said blade housing to vary a sectional passage area of said first flow space.

13. A lawn tractor as defined in claim 12, wherein said guide means is biased in a direction to diminish said sectional passage area of said first flow space.

14. A lawn tractor as defined in claim 12, wherein said blade housing further includes an observation window opposed to said guide means.

15. A lawn tractor comprising:
a mower unit,
said mower unit including:
   a blade housing having a ceiling wall, a front wall and a rear wall:
   cutting blades rotatably supported by said ceiling wall; and
   a discharge opening formed in a lateral end of said blade housing for discharging grass clippings cut by said cutting blades, along with air flows;
   a grass catcher disposed rearwardly of a tractor body;
   a transport duct for connecting said discharge opening to said grass catcher;
   a suction blower mounted in said transport duct;
   guide means for dividing a grass clipping flow space formed in a region of transition from said blade housing to said transport duct, along a flowing direction into a first flow space and a second flow space, said guide means being displaceable relative to said blade housing to vary a sectional passage area of said first flow space.

16. A lawn tractor as defined in claim 15, wherein said guide means is biased in a direction to diminish said sectional passage area of said first flow space.

* * * * *